Figure 1:
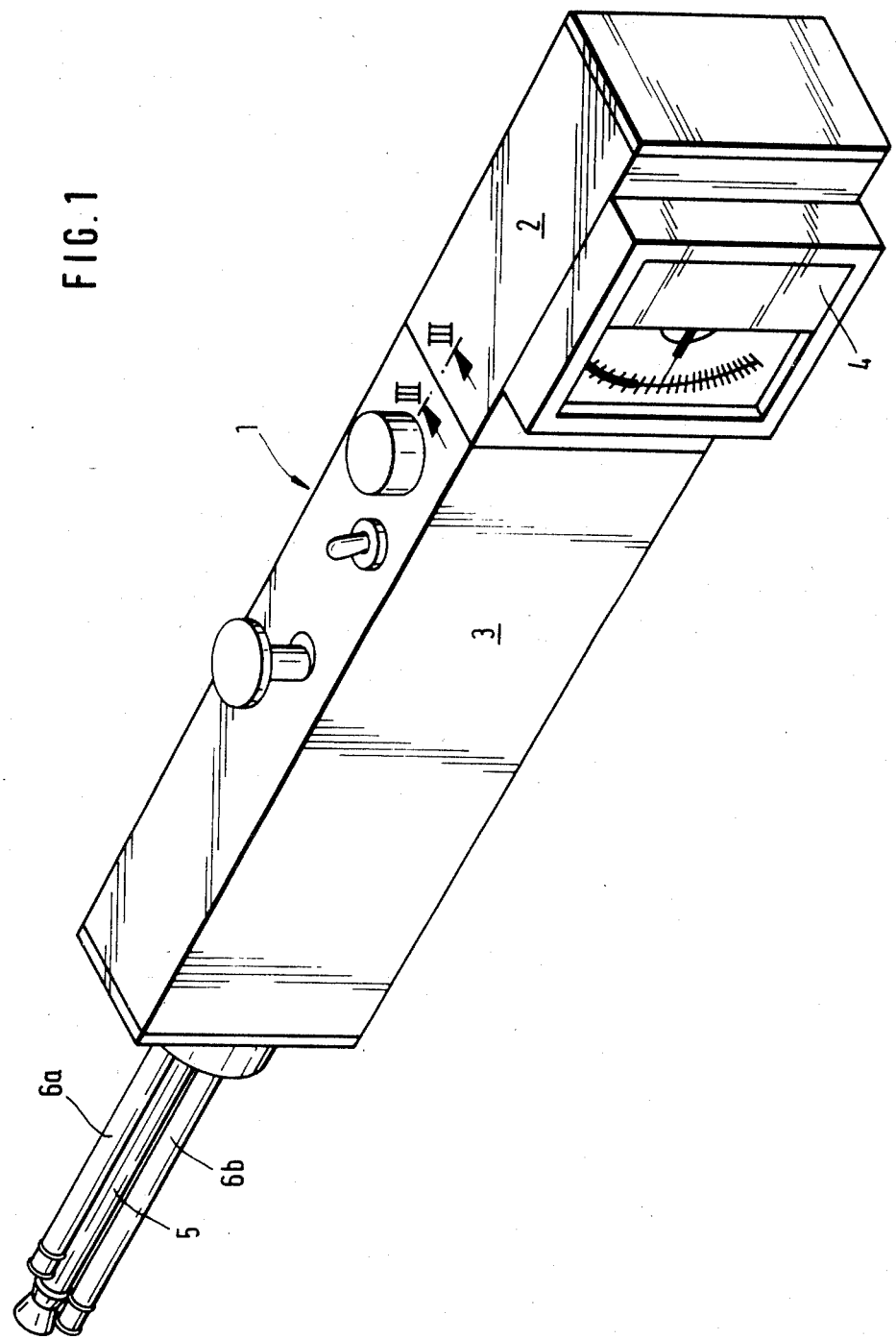

United States Patent [19]

Löwenheck

[11] Patent Number: 4,577,512
[45] Date of Patent: Mar. 25, 1986

[54] THREAD-TENSION METER

[75] Inventor: Konrad Löwenheck, Basel, Switzerland

[73] Assignee: N. Zivy & Cie, S.A., Oberwil, Switzerland

[21] Appl. No.: 642,206

[22] Filed: Aug. 20, 1984

[30] Foreign Application Priority Data

Sep. 21, 1983 [CH] Switzerland ......................... 5134/83

[51] Int. Cl.⁴ ........................ G01L 5/04; G01D 11/24
[52] U.S. Cl. .................................... 73/862.45; 73/431
[58] Field of Search ...................... 73/862.45–862.48, 73/431; 116/304

[56] References Cited

U.S. PATENT DOCUMENTS

| | | | |
|---|---|---|---|
| 1,650,603 | 11/1927 | Burton | 73/862.45 |
| 2,925,734 | 2/1960 | Gorgens | 73/431 X |
| 3,041,880 | 7/1962 | McCarvell et al. | 73/756 |
| 4,118,978 | 10/1978 | Löwenheck | 73/862.48 X |

FOREIGN PATENT DOCUMENTS 0928178  11/1947  France ........................... 73/862.47

Primary Examiner—Charles A. Ruehl
Attorney, Agent, or Firm—Kenway & Jenney

[57] ABSTRACT

The thread-tension meter has a housing (1) which is divided into a reading head (2) and a remaining housing part (3). The reading head (2) can be pivoted 90° relative to the remaining housing part (3), as required, so that it is possible to read off the thread tension easily in any position of the thread.

2 Claims, 4 Drawing Figures

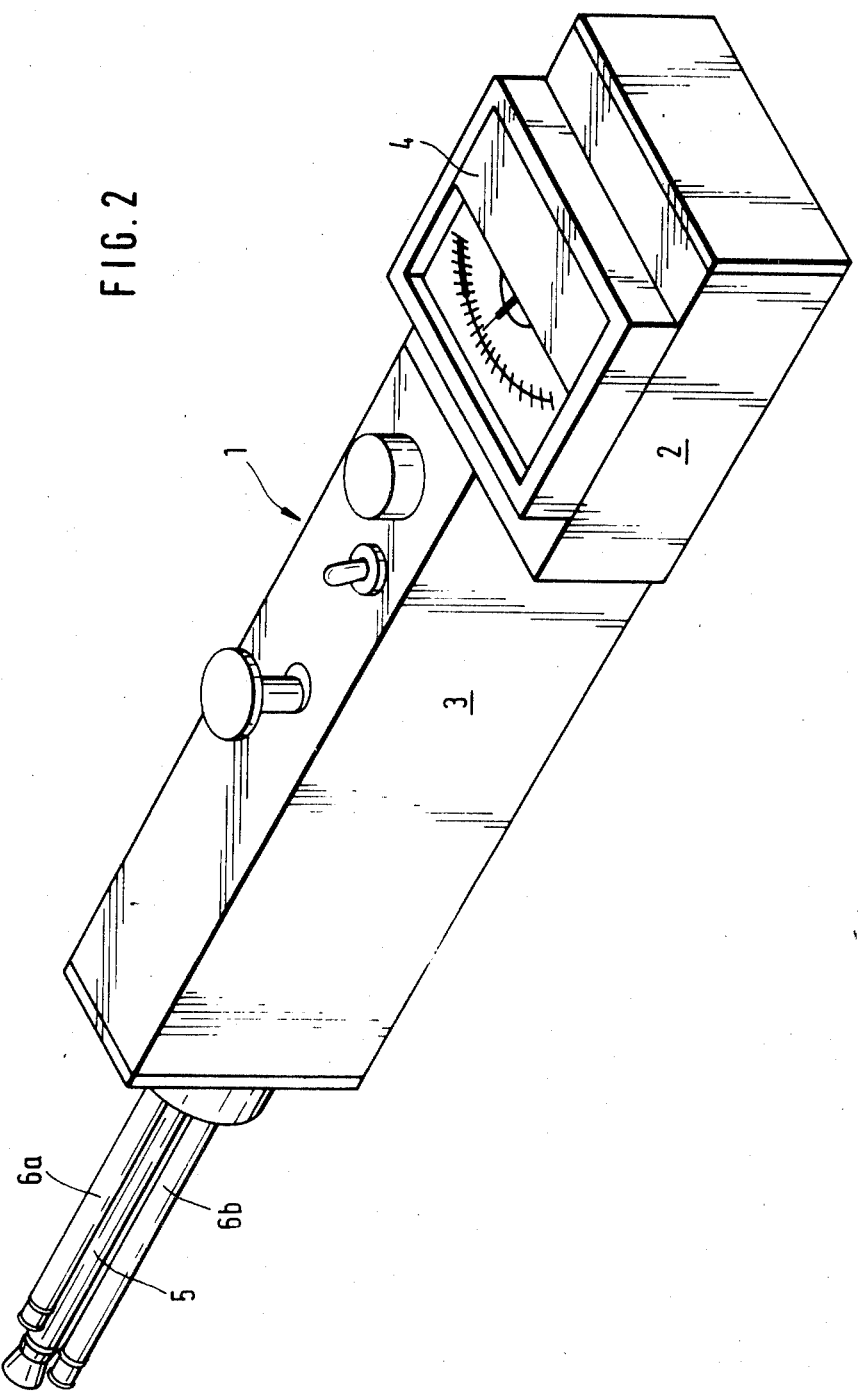

THREAD-TENSION METER

The invention relates to a thread-tension meter with a housing, a device projecting from the latter and intended for sensing the thread tension, and the mechanical and electronic equipment, cables and accessories arranged within the housing and intended for evaluating the measurement result, and with an indicator device located in an end portion of the housing and for reading off the measured value.

As is known, thread-tension meters of this type serve for periodically checking the particular tension of a thread or yarn on textile-processing machines, for example on a reeling machine. However, since the thread has to be measured at different points on the machine and in many cases is accessible only with difficulty, it has proved a disadvantage that, depending on the position of the measuring instrument, the indicator device indicating the measurement result sometimes points upwards, but at other times points to the side, consequently making it more difficult to read off the result. To eliminate this disadvantage, it has already been proposed to offer the thread-tension meter in two models with indicator devices arranged differently. However, it is obvious that this is a solution which is not only costly, but also complicated for the user of the measuring instrument.

The object of the present invention is, therefore to propose a thread-tension meter of the type mentioned above, the indicator device of which can be read off easily in any position of the instrument.

The thread-tension meter forming the subject of the invention is defined as a thread-tension meter in which the indicator device located in the end portion of the housing is arranged so as to be pivotable at least 45° relative to the remaining housing part. In the preferred embodiment, the end portion of the housing is designed as a self-contained housing part which is pressed against the remaining housing part by means of a spring and where there are means for adjusting the angle of the end portion relative to the remaining housing part.

An exemplary embodiment of the subject of the invention is described below with reference to the attached drawing.

Figure 4:
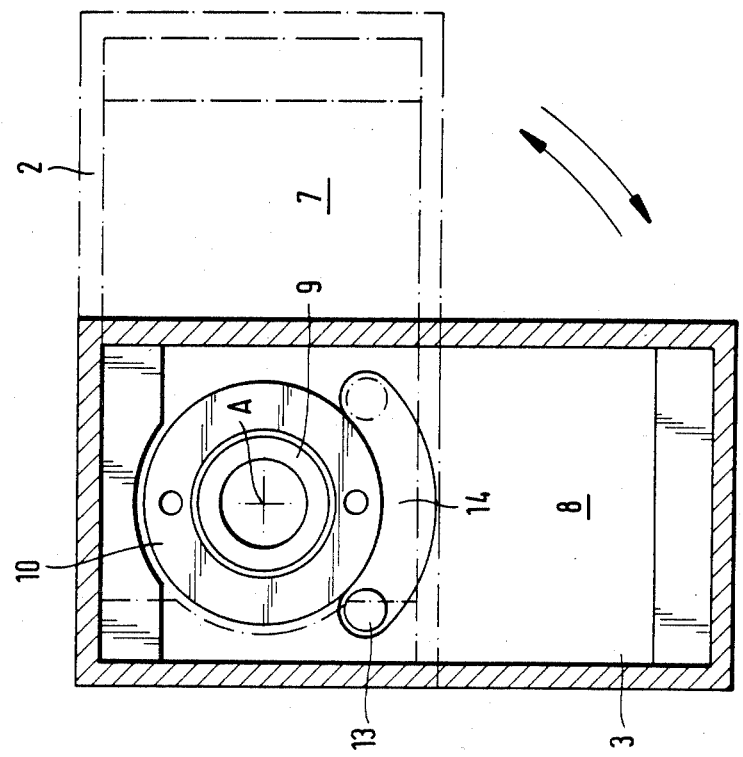
Figure 3:
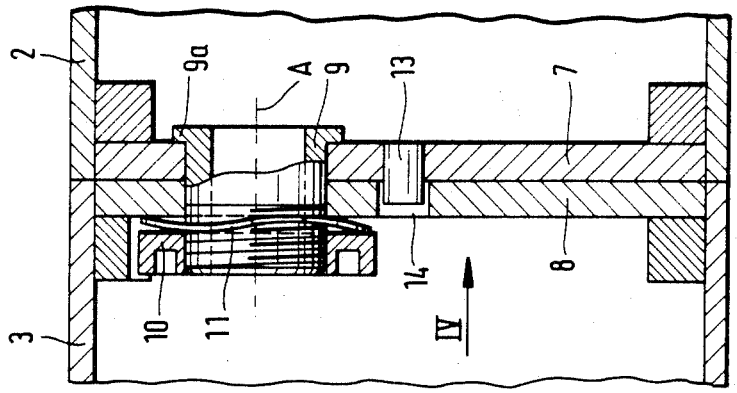

FIG. 1 is a perspective view of an embodiment of the thread-tension meter according to the invention, FIG. 2 shows the same instrument, also in perspective, but in another position of the indicator device, FIG. 3 is a section along the parting plane III—III in FIG. 1, and FIG. 4 is a view in the direction IV according to FIG. 3.

The thread-tension meter chosen as an exemplary embodiment has a housing 1 which is divided into an end portion 2 and the remaining housing part designated by 3. The end portion 2, henceforth referred to as a reading head, is provided with an indicator device 4 which can be analog or digital, as required, and which allows the measured thread tension to be read off. The equipment, cables and accessories necessary for evaluating and transmitting the measured values are accommodated within the housing 1. A measuring arm 5 and two guide arms 6a and 6b project from the housing part 3 at the end located opposite the reading head 2. The mechanical functioning of the thread-tension meter can be taken from Swiss patent specification No. 600,015.

As a comparison between FIGS. 1 and 2 shows, the reading head 2 can be pivoted 90° relative to the remaining housing part 3. According to FIG. 3, the reading head 2 is provided with an end wall 7 and a housing part 3 with an end wall 8. The two end walls 7 and 8 rest against one another with touch contact and are pressed against one another under slight pressure by means of a corrugated annular tensioning spring 11. According to the chosen exemplary embodiment, the constructive solution exhibits a cylindrical bush 9 which passes through the two end walls 7 and 8 and which rests on the end wall 7 by means of its flange 9a and carries a nut 10 at its opposite end. The said nut is screwed onto the bush 9 and presses the annular tensioning spring 11 against the end wall 8. This results, between the two end walls 7 and 8, in a frictional contact which depends on the pressing force of the spring 11 and the coefficient of friction of the surfaces touching one another. The prestress of the spring 11 can be varied when the nut 10 is actuated.

The bush 9 serves, on the one hand, as a pivot axle when the reading head 2 is pivoted relative to the remaining housing part 3 and, on the other hand, as a duct for the cables laid within the housing 1.

The pivot axis designated by A in FIG. 3 is arranged off-center relative to the housing axis, since the thread-tension meter can thereby be handled somewhat more easily even when the reading head 2 is swung out. However, it would be entirely possible to make the pivot axis A coincide with the longitudinal axis of the housing 1.

The pivot angle of the reading head 2 should be at least 45°, but it would seem appropriate, in almost all cases of practical use, to fix it at 90°. This restriction to a rotation of 90° is achieved by means of a pin 13 which is fastened in the end wall 7 and which projects into an annular groove 14 cut into the end wall 8.

The arrangement described makes it possible to check the thread tension easily, specifically regardless of whether the thread to be measured is at eye level, below it or above it. The thread can thus be checked directly without difficulty even at points on the textile-processing machine which are accessible only with difficulty.

In the present connection, the expression "thread" is intended to include all textile thread and yarn types, twine, etc., as well as threads or wires and thin thread-like strips made of another material, such as metal, plastic, etc., the tension of which has to be checked.

I claim:
1. A thread-tension meter comprising
   a housing consisting of a main portion and an end portion,
   a device projecting from the main portion of the housing and intended for sensing the thread tension,
   mechanical and electronic equipment, cables and accessories arranged within the housing for measuring the thread tension, and
   an indicator device located in the end portion of the housing for reading off the measured value,
   wherein the end portion of the housing in which the indicator device is located is self-contained,
   wherein the end portion is pivotable at least 45° relative to the main housing portion,
   wherein a bushing extends through the end wall of the end portion of the housing and the adjacent end wall of the main housing portion and serves as a pivot bearing and cable duct, wherein the end wall of the end portion of the housing adjacent the main housing portion is pressed by means of spring pressure against the adjacent end wall of the main housing portion, and wherein an annular tensioning spring on the periphery of the bushing is adjustable by means of a nut screwed onto the bushing.

2. A thread-tension meter as claimed in claim 1 wherein one of the two end faces has a groove in the form of an arc of a circle and is coaxial relative to the axis of rotation of said housing end portion and into which projects a bolt fastened to or formed on the other end face in order thereby to limit the rotation of said end portion relative to the main housing portion to a desired angle, preferably 90°.

* * * * *